United States Patent
Standke et al.

(10) Patent No.: US 6,816,711 B2
(45) Date of Patent: Nov. 9, 2004

(54) GPS EQUIPPED MOBILE PHONE WITH SINGLE SHARED ANTENNA

(75) Inventors: Randolph Standke, San Diego, CA (US); Paul Peterzell, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 309 days.

(21) Appl. No.: 09/995,551

(22) Filed: Nov. 27, 2001

(65) Prior Publication Data

US 2003/0100333 A1 May 29, 2003

(51) Int. Cl.[7] .............. H04B 1/38; H04B 1/44; H04B 1/46; H04M 1/00
(52) U.S. Cl. .............. 455/73; 455/78; 455/80; 455/552.1
(58) Field of Search .............. 455/73, 78, 80, 455/552.1; 342/70

(56) References Cited

U.S. PATENT DOCUMENTS

| | | | | |
|---|---|---|---|---|
| 5,973,636 A | * | 10/1999 | Okubo et al. | 342/70 |
| 6,560,443 B1 | * | 5/2003 | Vaisanen et al. | 455/73 |
| 2003/0054775 A1 | * | 3/2003 | Eaves et al. | 455/80 |
| 2003/0100333 A1 | * | 5/2003 | Standke et al. | 455/552 |
| 2003/0171098 A1 | * | 9/2003 | Tai et al. | 455/78 |

FOREIGN PATENT DOCUMENTS

JP 09321654 A * 12/1997

* cited by examiner

Primary Examiner—William Cumming
(74) Attorney, Agent, or Firm—Philip Wadsworth; Charles D. Brown; Howard H. Seo

(57) ABSTRACT

An antenna sharing system and method. In the illustrative embodiment, the inventive system includes a first matching network coupled to a first circuit; a second matching network coupled to a second circuit; and a switch having a first throw coupled to the first network, a second throw coupled to the second network, and a pole coupled to the antenna. In the specific implementation, the first circuit is a cellular subsystem and the second circuit is a Global Positioning System subsystem. The system further includes a controller for selectively actuating the switch whereby the first network is coupled to the antenna in a first operational mode and the second network is coupled to the antenna in a second operational mode. In the illustrative implementation, the first network provides an impedance match to the switch and the antenna with respect to the first circuit. The second network provides an impedance match to the switch and the antenna with respect to the second circuit. In the preferred embodiment, the invention includes a first diplexer network coupled to a first circuit; a second diplexer network coupled to a second circuit; and an antenna match which incorporates a shunt SPST switch to shift the matching frequency between the cellular (or PCS) and GPS bands.

22 Claims, 3 Drawing Sheets

GPS EQUIPPED MOBILE PHONE WITH SINGLE SHARED ANTENNA

BACKGROUND OF THE INVENTION

1. Field of Invention

This invention relates to antennas. Specifically, the present invention relates to antennas used for mobile communication and Global Positioning System applications.

2. Description of the Related Art

Currently, there is an ongoing need to add additional features to mobile telephones equipped with high and low band transceivers, e.g., U.S. Cellular, Japan Cellular, Korean PCS, U.S. PCS, NMT, IMT2000 etc. One feature currently under consideration relates to position location. That is, in response to U.S. Government mandates relating to the provision of emergency services, the cellular telephone industry is currently looking into a variety of systems and techniques for ascertaining the position of a user of a cellular telephone. In fact, cellular and PCS service providers around the world are considering position location technology as a future enhancement. One very promising approach involves a use of the Global Positioning System (GPS).

The GPS system consists of a constellation of low earth orbiting satellites that transmit signals in accordance with a highly accurate onboard clock. Signals received from four satellites by a receiver located on or near the surface of the earth are triangulated to provide a fix on location of the receiver.

While current proposals involve an integration of the GPS receiver into the electronic circuitry of a cellular phone, current designs call for the use of separate antennas for the cellular communications and GPS position location subsystems thereof.

For numerous reasons, e.g. size, cost, weight, and consumer appeal, there is a need for a system or method for using a single antenna to effect communication to and from two or more separate transmitters or receivers in a mobile telephone or other system with a small form factor.

SUMMARY OF THE INVENTION

The need in the art is addressed by the antenna sharing system and method of the present invention. In the illustrative embodiment, the inventive system is adapted for use with an antenna and includes a first matching network coupled to a first circuit; a second matching network coupled to a second circuit; and a switch having a first throw coupled to the first network, a second throw coupled to the second network, and a pole coupled to the antenna.

In the specific implementation, the first circuit is a mobile subsystem and the second circuit is a Global Positioning System subsystem. The system further includes a controller for selectively actuating the switch whereby the first network is coupled to the antenna in a first operational mode and the second network is coupled to the antenna in a second operational mode.

In the illustrative implementation, the first network provides an impedance match to the switch and the antenna with respect to the first circuit. The second network provides an impedance match to the switch and the antenna with respect to the second circuit. The first network includes a first inductor (L1) connected between the first circuit and ground, a second inductor (L2) connected between the first throw and ground and a capacitor (C1) between the first throw and the first circuit. The second network includes a first inductor (L3) connected between the second throw and ground and a second inductor (L4) connected between the second throw and the second circuit.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
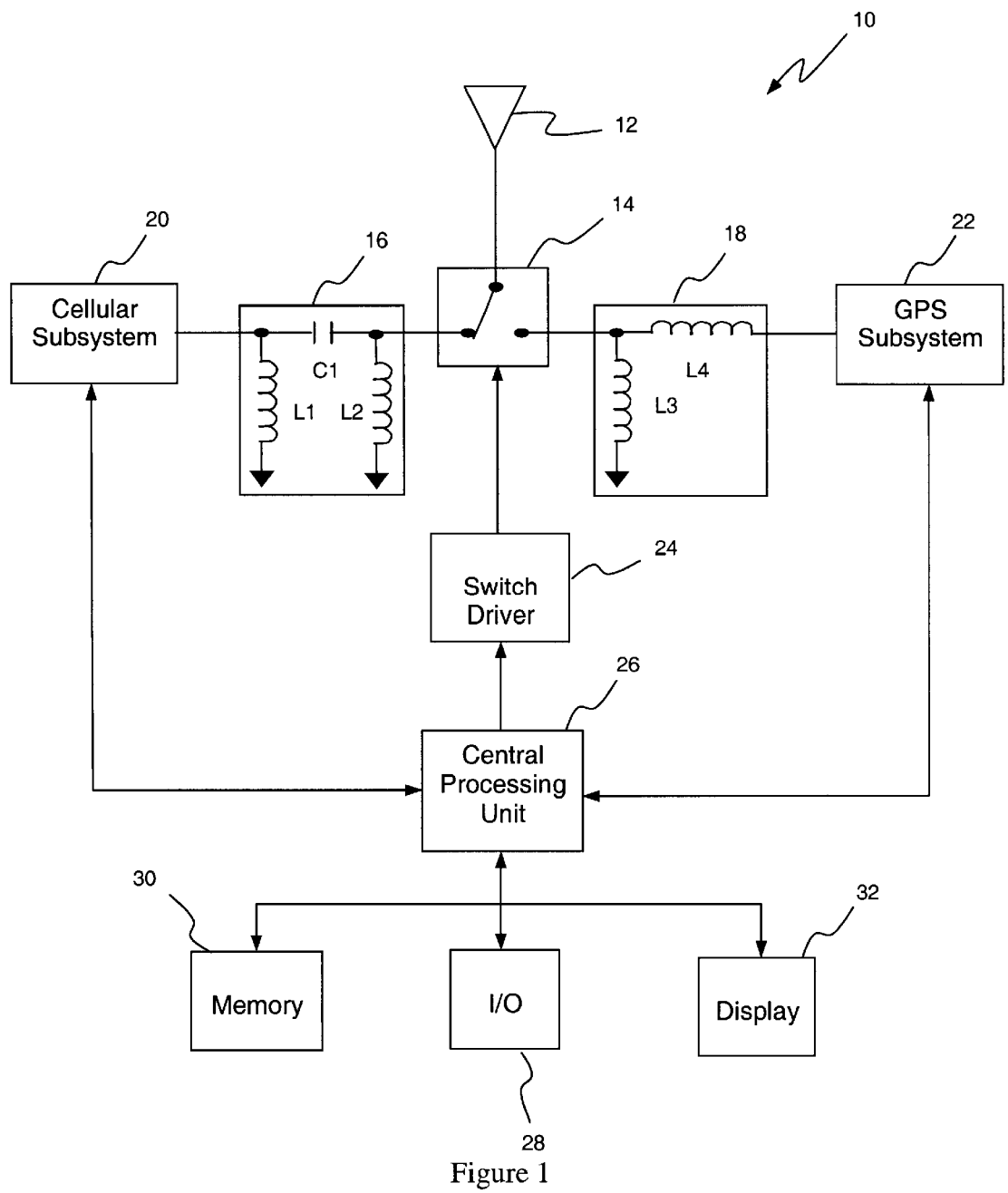
FIG. 1 is a block diagram showing an illustrative embodiment of an antenna sharing system implemented in accordance with the teachings of the present invention.

FIG. 1 is a block diagram showing an illustrative embodiment of an antenna sharing system implemented in accordance with the teachings of the present invention for generic cellular (or PCS) subsystems. As shown in FIG. 1, the system 10 includes a whip or helical antenna 12 adapted to operate at the frequencies of interest. In the illustrative embodiment, the antenna 12 is designed to perform within specification at both GPS and cellular or PCS (Personal Communication System) frequencies. As will be appreciated by one of ordinary skill in the art, optimal performance at either set of frequencies will require an appropriate matching network and typically a separate antenna. In accordance with the present teachings, however, a single antenna is used for both sets of frequencies.

This advantageous operation is afforded by coupling the antenna 12 to an appropriate matching network via a switch 14. In the best mode, the switch 14 is an electronic switch, e.g. micro-electro-mechanical (MEM) switch, field effect transistor (FET), PIN diode etc. However, other switching technologies may be used without departing from the scope of the present teachings. The insertion loss (as low as possible) and intercept point (IIP3~60 dBm) must be optimized to meet the performance requirements for a particular application. Some technologies may offer advantages in terms of performance in these areas (GaAs, FETs or MEMs). In any event, those skilled in the art will appreciate that the present invention is not limited to the switching technology employed.

In the illustrative embodiment, the switch is a single pole, double throw (SPDT) switch. As shown in FIG. 1, the pole of the switch 14 is connected to the antenna 12 and the first throw thereof is connected to a mobile subsystem 20 via a first matching network 16. The second throw of the switch is connected to a GPS subsystem 22 via a second matching network 18.

The first and second matching networks may be of any design required for a given application without departing from the scope of the present teachings. In the illustrative embodiment, the first network 16 is an LC network and includes a first inductor L1 connected between the mobile subsystem 20 and ground, a second inductor L2 connected between the first throw of the switch 14 and ground and a capacitor C1 connected between the first and second inductors L1 and L2.

In the illustrative embodiment shown in FIG. 1, the second network 18 includes a third inductor L3 connected between the second throw of the switch 14 and ground and a fourth inductor L4 connected between the GPS system and the second throw of the switch 14.

In many practical SPDT switches, the active circuitry may introduce distortion in the mobile mode. This is especially true for CDMA transceivers, where the transmit signal can modulate any jamming signals in the receive band. This distortion is often referred to as cross-modulation and can be related to the measured intercept point of the device. With a higher intercept point, a lower level of distortion is achieved. To avoid cross-modulation, it is prudent to avoid using electrical switches in series with the signal path. As an alternative solution, the SPDT switch should be implemented in a process technology which has an inherently high intercept point.

In the preferred embodiment, the system includes a first diplexer network coupled to a first circuit; a second diplexer network coupled to a second circuit; and an antenna match which incorporates a shunt SPST switch to shift the matching frequency between the cellular (or PCS) and GPS bands. The preferred embodiment is illustrated in FIG. 2.

Figure 2:
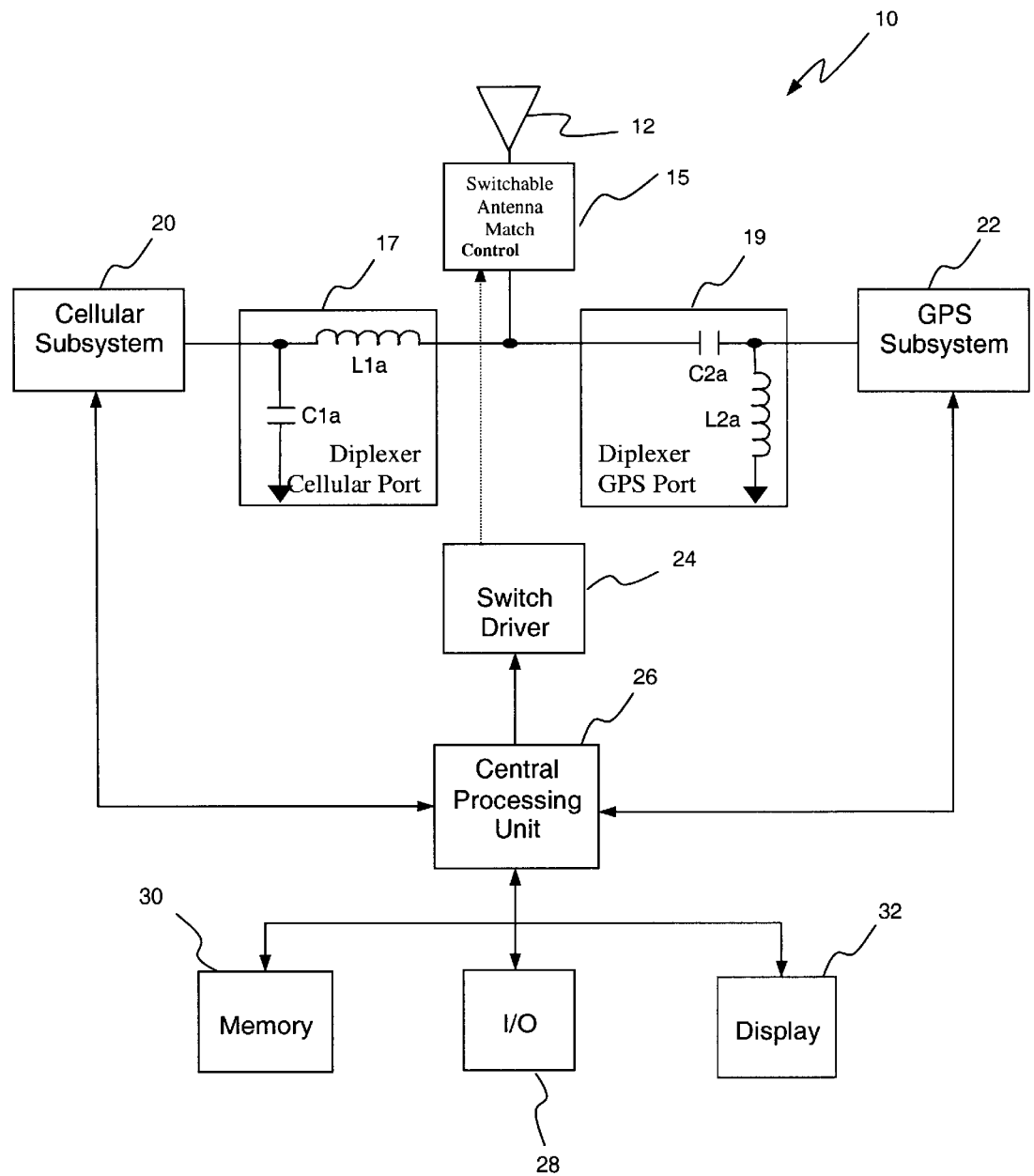
FIG. 2 is a block diagram showing a preferred embodiment of an antenna sharing system implemented in accordance with the teachings of the present invention.

FIG. 2 is a block diagram showing a preferred embodiment of an antenna sharing system implemented in accordance with the teachings of the present invention for CDMA cellular (or PCS) subsystems. As shown in FIG. 2, the system 10 includes a whip or helical antenna 12 adapted to operate at the frequencies of interest. In the illustrative embodiment, the antenna 12 is designed to perform within specification at both GPS and cellular or PCS (Personal Communication System) frequencies. As will be appreciated by one of ordinary skill in the art, optimal performance at either set of frequencies will require an appropriate matching network and typically a separate antenna. In accordance with the present teachings, however, a single antenna is used for both sets of frequencies.

In the specific implementation shown in FIG. 2, the first circuit is a mobile subsystem and the second circuit is a Global Positioning System subsystem. The system further includes a controller for selectively actuating the switch within the antenna matching circuit connected to the antenna, whereby the switch is preferably in the off-state when the mobile subsystem is active and in the on-state when the GPS subsystem is active.

There are two primary criteria for the design of the switching circuit and antenna matching elements. The first criteria is that the antenna match should be optimized to meet the radiated performance requirements for cellular (or PCS) and GPS operation. The second criteria is that the antenna match must introduce little or no distortion (high intercept point) to the signal path in cellular (or PCS) mode. The second criteria takes into account the effect of cross-modulation in a CDMA transceiver. In GPS mode, there is no transmitter active, hence the switch can lower the intercept point as measured at the antenna port.

Figure 3:
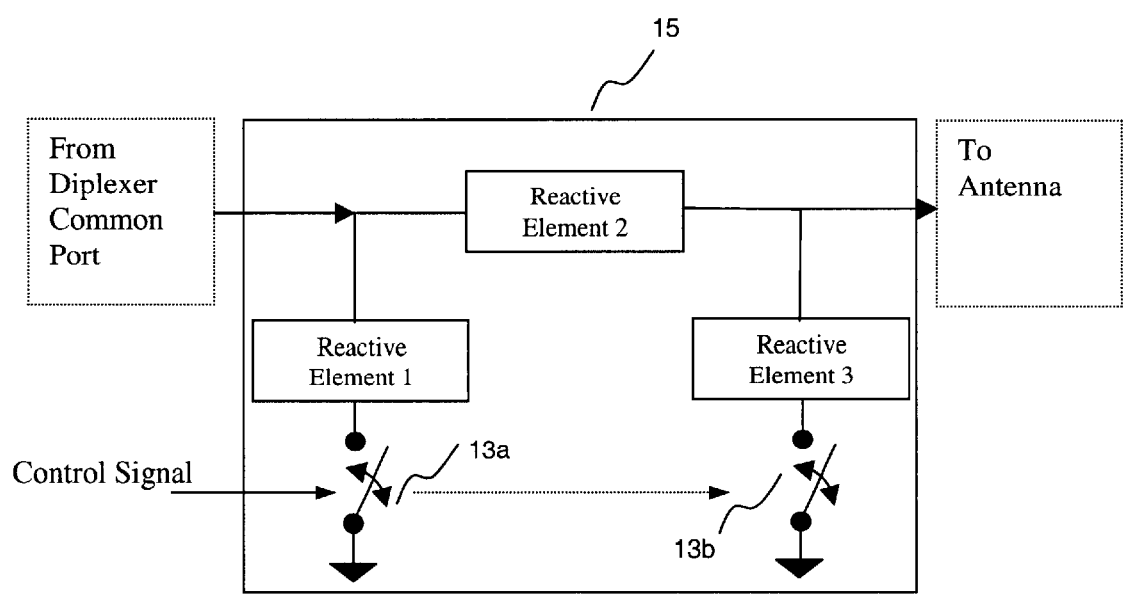
FIG. 3 is a block diagram of the switchable matching circuit embodiment of an antenna sharing system implemented in accordance with the teachings of the present invention for CDMA cellular (or PCS) subsystems.

As shown in FIGS. 2 and 3, advantageous operation is afforded by coupling the antenna 12 to a switchable matching network 15. As discussed more fully below, the switchable matching network 15 is also connected to a diplexer which combines the GPS and cellular operating frequencies. In the best mode, the switch used in network 15 in FIG. 3 is an electronic switch, e.g. micro-electro-mechanical (MEM) switch, field effect transistor (FET), PIN diode etc. However, other switching technologies may be used without departing from the scope of the present teachings.

In the illustrative implementation shown in FIG. 2, the first network 17 provides isolation between the first circuit 20 and the antenna matching network 15 at GPS frequencies. In the illustrative embodiment, the first network 17 is an LC network and includes a first capacitor C1a connected between the mobile subsystem 20 and ground and a first inductor L1a connected between the antenna matching network 15 and the mobile subsystem 20.

In the illustrative embodiment as shown in FIG. 2, the second network 19 provides isolation between the second circuit 22 and the antenna matching network 15 at cellular (or PCS) frequencies. In the illustrative embodiment, the second network 19 is an LC network and includes a second capacitor C2a connected between the GPS subsystem 22 and the antenna matching network 15, and a second inductor L2a connected between the GPS subsystem 22 and ground. Each of these networks are commonly referred as diplexers or duplexers. A diplexer's function is to connect multiple operating bands into one common signal path.

In the best mode, the first and second networks 17 and 19 are combined into one component which embeds the inductors and capacitors needed to connect the cellular and GPS subsystems to a common antenna match.

The key advantages to the embodiment shown in FIG. 2 is that distortion, when using the mobile subsystem, is minimized and insertion loss for both subsystems is less than in FIG. 1.

FIG. 3 is a block diagram showing an illustrative implementation of the antenna matching network. In the illustrative embodiment of FIG. 3, the antenna matching network 15 is an LC network combined with a SPST switch 13. The antenna matching network serves to shift the antenna match frequency between cellular and GPS subsystems. The antenna matching network 15 includes a reactive element 1 (either L or C depending on the matching requirements) connected in series with the SPST switch 13 to ground and the diplexers 17 and 19. The antenna matching network 15 also includes a series reactive element 2 connected between the diplexers 17 and 19 and the antenna 12. The antenna matching network 15 optionally includes a third reactive element 3. This component is connected in shunt with the antenna to ground.

In FIG. 3, the shunt reactive matching element 1 and/or 3 is disconnected in mobile mode; thereby no distortion is injected in the signal path. The switch 13a or 13b is closed in GPS mode to shift the antenna match to the appropriate frequency from the cellular (or PCS) band. In the preferred embodiment, the switch is a single pole, single throw (SPST) switch.

The matching networks used in 15, 17 and 19 may be of any design as required for a given application without departing from the scope of the present teachings.

The switch 13a or 13b (FIG. 2) or 14 (FIG. 1) is actuated by a conventional switch driver 24 in response to a signal from a central processing unit or controller 26. The switch driver 24 is adapted to provide electrical signals appropriate for the switch 13a, 13b or 14. The central processing unit 26 provides a phone/GPS mode control signal to the switch 13a, 13b, or 14 via the driver 24. The central processing unit also receives input from and provides output to a user interface 28 and communicates with a memory 30 and a display 32.

The present invention takes advantage of the fact that phone operation and GPS reception do not occur at the same time. Hence, it is expected that, at any particular time, the antenna will be connected to the GPS subsystem or the mobile subsystem. The phone will spend most of the time with the antenna 12 connected to the mobile subsystem 20. When a position fix is needed, the phone will be switched to the GPS subsystem 22 for approximately one second or less (typically) interrupting mobile operation for that time.

Thus, the present invention has been described herein with reference to a particular embodiment for a particular application. Those having ordinary skill in the art and access to the present teachings will recognize additional modifications, applications and embodiments within the scope thereof. For example, the present invention is not limited to use with GPS and cellular subsystems. A variety of subsystems may be selectively actuated in accordance with the teachings of the present invention.

It is therefore intended by the appended claims to cover any and all such applications, modifications and embodiments within the scope of the present invention.

Accordingly,

What is claimed is:

1. An antenna sharing system for use with an antenna comprising:
    a first matching network coupled to a first circuit;
    a second matching network coupled to a second circuit; and
    a switch having a first throw coupled to said first network, a second throw coupled to said second network, and a pole coupled to said antenna.

2. The invention of claim 1 wherein said first network provides an impedance match to said switch and said antenna with respect to said first circuit.

3. The invention of claim 1 wherein said second network provides an impedance match to said switch and said antenna with respect to said second circuit.

4. The invention of claim 1 further including means for selectively actuating said switch whereby said first network is coupled to said antenna in a first operational mode and said second network is coupled to said antenna in a second operational mode.

5. The invention of claim 4 wherein said means for selectively actuating includes a central processing unit.

6. The invention of claim 5 wherein said means for selectively actuating further includes a switch driver.

7. The invention of claim 1 wherein said first circuit is a cellular or PCS subsystem.

8. The invention of claim 7 wherein said first network is an inductive/capacitive network.

9. The invention of claim 8 wherein said first network includes a first inductor connected between said first circuit and ground, a second inductor connected between said first throw and ground and a capacitor between said first throw and said first circuit.

10. The invention of claim 1 wherein said second circuit is a Global Positioning System subsystem.

11. The invention of claim 10 wherein said second network includes a first inductor connected between said second throw and ground and a second inductor connected between said second throw and said second circuit.

12. The invention of claim 1 further including a user interface.

13. A GPS equipped cellular or PCS telephone system comprising:
    an antenna;
    a first matching network coupled to a cellular or PCS subsystem;
    a second marching network coupled to a GPS subsystem;
    a switch having a first throw coupled to said first network, a second throw coupled to said second network, and a pole coupled to said antenna;
    a central processing unit for selectively actuating said switch whereby said first network is coupled to said antenna in a first operational mode and said second network is coupled to said antenna in a second operational mode; and a user interface coupled to said central processing unit.

14. The invention of claim 13 wherein said first network provides an impedance match to said switch and said antenna with respect to said cellular or PCS subsystem.

15. The invention of claim 14 wherein said second network provides an impedance match to said switch and said antenna with respect to said Global Positioning System subsystem.

16. The invention of claim 15 wherein said first network includes a first inductor connected between said cellular subsystem and ground, a second inductor connected between said first throw and ground and a capacitor between said first throw and said cellular or PCS subsystem.

17. The invention of claim 15 wherein said second network includes a first inductor connected between said second throw and ground and a second inductor connected between said second throw and said Global Positioning System subsystem.

18. An antenna sharing system for use with an antenna comprising:
    a first matching network coupled to said antenna, said first matching network including first and second reactive elements and a switch connected to said first element;
    a second matching network coupled between said first matching network and a first circuit;
    a third matching network coupled between said first matching network and a second circuit and
    means for activating said switch.

19. An antenna sharing system for use with an antenna comprising:
    a switchable matching network coupled to said antenna;
    a first diplexer coupled between said first matching network and a first circuit;
    a second diplexer coupled between said first matching network and a second circuit and
    means for activating said switch matching network.

20. The invention of claim 19 wherein said matching network includes first and second reactive circuits and a switch.

21. The invention of claim 19 wherein said first diplexer is a cellular or PCS diplexer.

22. The invention of claim 21 wherein said second diplexer is a GPS diplexer.

* * * * *